(12) United States Patent
Kurata et al.

(10) Patent No.: US 10,991,363 B2
(45) Date of Patent: *Apr. 27, 2021

(54) PRIORS ADAPTATION FOR CONSERVATIVE TRAINING OF ACOUSTIC MODEL

(71) Applicant: INTERNATIONAL BUSINESS MACHINES CORPORATION, Armonk, NY (US)

(72) Inventors: Gakuto Kurata, Tokyo (JP); Bhuvana Ramabhadran, Mount Kisco, NY (US); Masayuki Suzuki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,305

(22) Filed: Nov. 6, 2017

(65) Prior Publication Data
US 2019/0066662 A1 Feb. 28, 2019

Related U.S. Application Data

(63) Continuation of application No. 15/686,808, filed on Aug. 25, 2017.

(51) Int. Cl.
*G10L 15/14* (2006.01)
*G10L 15/02* (2006.01)
(Continued)

(52) U.S. Cl.
CPC ............. *G10L 15/14* (2013.01); *G10L 15/02* (2013.01); *G10L 15/065* (2013.01); *G10L 15/16* (2013.01); *G10L 15/20* (2013.01); *G10L 15/063* (2013.01)

(58) Field of Classification Search
CPC ....... G10L 15/02; G10L 15/063; G10L 15/14; G10L 15/16; G10L 15/065; G10L 15/20
See application file for complete search history.

(56) References Cited

U.S. PATENT DOCUMENTS 9,466,292 B1 * 10/2016 Lei ........................ G10L 15/16
2010/0145699 A1 * 6/2010 Tian
(Continued)

OTHER PUBLICATIONS

Liao, H, (2013), "Speaker Adaptation of Context Dependent Deep Neural Network", 2013 ICASSP Proceedings, pp. 7947-7951.*
(Continued)

*Primary Examiner* — Angela A Armstrong
(74) *Attorney, Agent, or Firm* — Tutunjian & Bitetto, P.C.; Randall Bluestone

(57) ABSTRACT

An apparatus, method, and computer program product for adapting an acoustic model to a specific environment are defined. An adapted model obtained by adapting an original model to the specific environment using adaptation data, the original model being trained using training data and being used to calculate probabilities of context-dependent phones given an acoustic feature. Adapted probabilities obtained by adapting original probabilities using the training data and the adaptation data, the original probabilities being trained using the training data and being prior probabilities of context-dependent phones. An adapted acoustic model obtained from the adapted model and the adapted probabilities.

14 Claims, 5 Drawing Sheets

(51) Int. Cl.
  *G10L 15/16*   (2006.01)
  *G10L 15/065*  (2013.01)
  *G10L 15/20*   (2006.01)
  *G10L 15/06*   (2013.01)

(56) References Cited

U.S. PATENT DOCUMENTS

2015/0066507 A1* 3/2015 Nakamura ............. G10L 25/51
                                                  704/240
2015/0161994 A1* 6/2015 Tang et al.

OTHER PUBLICATIONS

Liao, H, (2013), "Speaker Adaptation of Context Dependent Deep Neural Network", 2013 ICASSP Proceedings, pp. 7947-7951. (Year: 2013).*

Yu et al, 2013), "KL-Divergence Regularized Deep Neural Network Adaptation for Improved Large Vocabulary Speech Recognition," 2013 ICASSP Proceedings, pp. 7893-7897, (2013).*

Liao, "Speaker Adaptation of Context Dependent Deep Neural Networks", Google Inc., May 2013, New York, NY, pp. 1-5.

Yu, "KL-Divergence Regularized Deep Neural Network Adaptation for Improved Large Vocabulary Speech Recognition", ICASSP, IEEE, (2013) pp. 7893-7897.

List of IBM Patents or Patent Applications Treated as Related dated Nov. 6, 2017, 2 pages.

\* cited by examiner

PRIORS ADAPTATION FOR CONSERVATIVE TRAINING OF ACOUSTIC MODEL

BACKGROUND

Technical Field

The present invention relates to an adaptation of an acoustic model.

Description of the Related Art

Recently, various techniques have been known regarding an adaptation of an acoustic model.

SUMMARY

According to an embodiment of the present invention, there is provided a computer-implemented method for adapting an acoustic model to a specific environment. The method includes obtaining an adapted model by adapting an original model to the specific environment using adaptation data. The original model is trained using training data. The original model is used to calculate probabilities of context-dependent phones given an acoustic feature. The method includes obtaining adapted probabilities by adapting original probabilities using the training data and the adaptation data. The original probabilities are trained using the training data. The probabilities are prior probabilities of context-dependent phones. The method includes obtaining an adapted acoustic model from the adapted model and the adapted probabilities.

According to another embodiment of the present invention, there is provided an apparatus for adapting an acoustic model to a specific environment. The apparatus includes a processor and a memory coupled to the processor. The memory includes program instructions. The program instructions are executable by the processor to cause the processor to perform the aforementioned method.

According to yet another embodiment of the present invention, there is provided a computer program product for adapting an acoustic model to a specific environment. The computer program product includes a computer readable storage medium includes program instructions embodied with the computer readable storage medium. The program instructions are executable by a computer to cause the computer to perform the aforementioned method.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

An acoustic model may be a model for calculating probabilities $p(X|s;\theta_{mlp},\theta_{up})$, which are required in hybrid approach based speech recognition. The variable "s" denotes a state (in these exemplary embodiments, assumed to be a context-dependent phone), and the variable "X" denotes an acoustic feature. Note that variables $\theta_{mlp}$ and $\theta_{up}$ denote parameters, and they will be described later. The probabilities may be converted using Bayes' theorem as follows.

$$p(X|s;\theta_{mlp},\theta_{up})=(p(s|X;\theta_{mlp})p(X))/p(s;\theta_{up})$$

In this conversion formula, the probabilities $p(s|X;\theta_{mlp})$ may each be a probability of a context-dependent phone "s" given an acoustic feature "X". The probabilities $p(s|X;\theta_{mlp})$ may be modeled by a neural network. In this case, the variable $\theta_{mlp}$ denotes a parameter of the neural network.

The probabilities p(X) are independent from context-dependent phones.

The probabilities $p(s;\theta_{up})$ may each be a prior probability of a context-dependent phone "s". Hereinafter, the probabilities $p(s;\theta_{up})$ are referred to as unigram probabilities of context-dependent phones. The unigram probabilities $p(s;\theta_{up})$ may be modeled by a multinominal distribution. In this case, the variable $\theta_{up}$ denotes a parameter of the multinominal distribution.

Although the above acoustic model may work sufficiently for a generic environment, it is sometimes desirable to adapt the acoustic model to a specific environment. Thus, the exemplary embodiments may adapt the acoustic model to the specific environment. The exemplary embodiments may adapt not only the parameter $\theta_{mlp}$ but also the parameter $\theta_{up}$.

Figure 1:
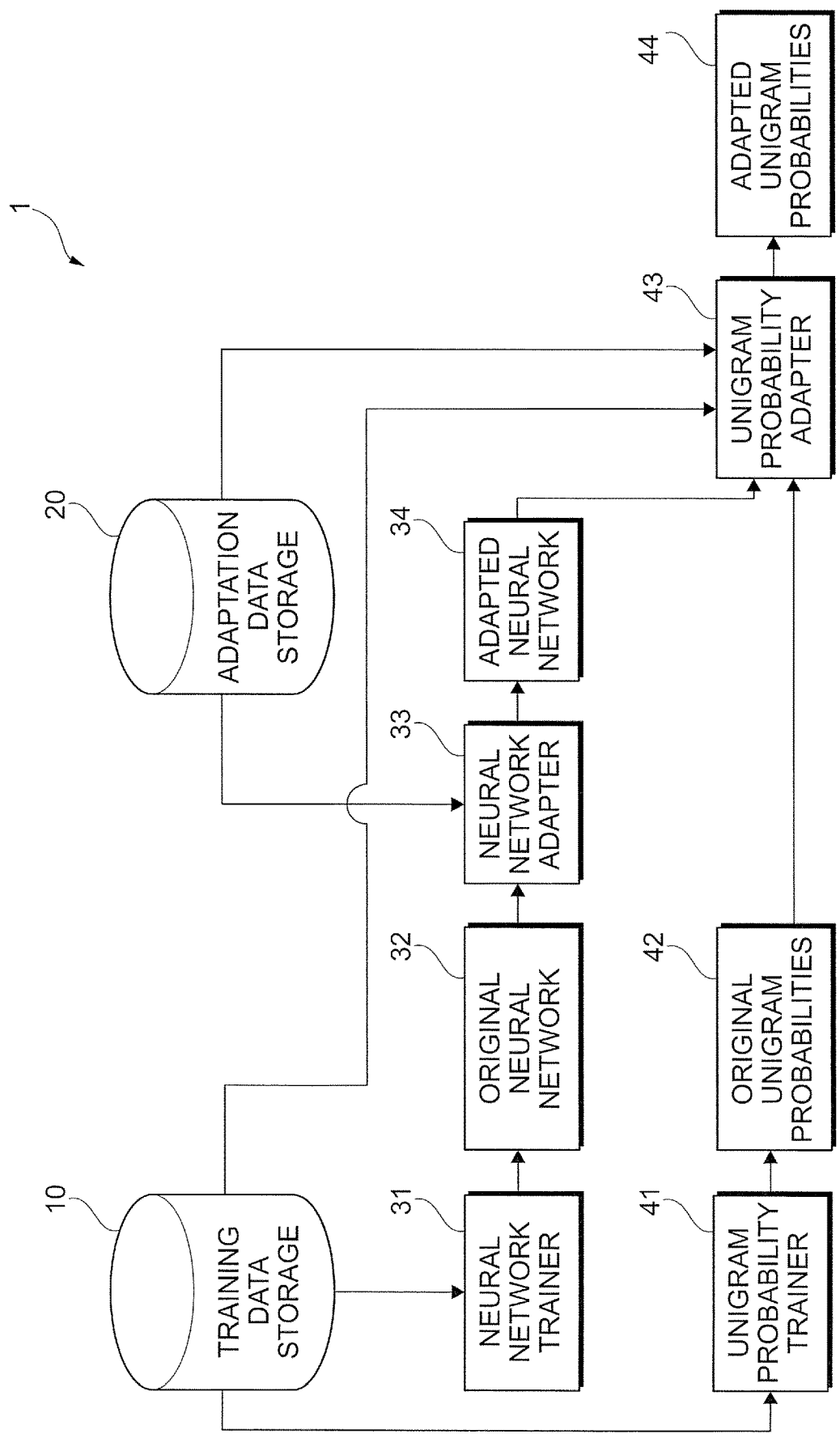
FIG. 1 depicts a block diagram of an acoustic model adaptation system according to the first exemplary embodiment of the present invention.

Referring to FIG. 1, there is shown a block diagram of an acoustic model adaptation system 1 to which a first exemplary embodiment is applied. As shown in FIG. 1, the acoustic model adaptation system 1 may include a training data storage 10 and an adaptation data storage 20. The acoustic model adaptation system 1 may further include a neural network trainer 31 and a neural network adapter 33. The acoustic model adaptation system 1 may furthermore include a unigram probability trainer 41 and a unigram probability adapter 43. Note that FIG. 1 also shows an original neural network 32, an adapted neural network 34, original unigram probabilities 42, and adapted unigram probabilities 44, although they are not elements constituting the acoustic model adaptation system 1 but elements obtained in the acoustic model adaptation system 1.

The training data storage 10 may store training data to be used by the neural network trainer 31, the unigram probability trainer 41 and the unigram probability adapter 43. The training data may include acoustic features of each context-dependent phone. Hereafter, a count of the k-th context-dependent phone in the training data is referred to as "training_data_count_k" (k is a natural number corresponding to a context-dependent phone).

The adaptation data storage 20 may store adaptation data to be used by the neural network adapter 33 and the unigram probability adapter 43. The adaptation data may include acoustic features of each context-dependent phone. Hereafter, a count of the k-th context-dependent phone in the adaptation data is referred to as "adaptation_data_count_k" (k is a natural number corresponding to a context-dependent phone).

The neural network trainer 31 may train the original neural network 32 by estimating the parameter $\theta_{mlp}$ using the training data stored in the training data storage 10. The original neural network 32 may be a neural network trained by the neural network trainer 31. Note that the original neural network 32 serves as one example of the claimed original model. The neural network adapter 33 may adapt the original neural network 32 to a certain environment by changing the parameter $\theta_{mlp}$ using the adaptation data stored in the adaptation data storage 20. The adapted neural network 34 may be a neural network adapted by the neural network adapter 33. Note that the adapted neural network 34 serves as one example of the claimed adapted model.

The unigram probability trainer 41 may train the original unigram probabilities 42 by estimating the parameter $\theta_{up}$ using the training data stored in the training data storage 10. The original unigram probabilities 42 may be unigram probabilities of context-dependent phones trained by the unigram probability trainer 41. Note that the original unigram probabilities 42 serve as one example of the claimed original probabilities. The unigram probability adapter 43 may adapt the original unigram probabilities 42 by changing the parameter $\theta_{up}$ using the training data stored in the training data storage 10 and the adaptation data stored in the adaptation data storage 20. The adapted unigram probabilities 44 may be unigram probabilities of context-dependent phones adapted by the unigram probability adapter 43. Note that the adapted unigram probabilities 44 serve as one example of the claimed adapted probabilities. The adapted unigram probabilities 44, which are appropriate, might be between the original unigram probabilities 42 and unigram probabilities obtained using only the adaptation data. The adapted unigram probabilities 44 may be caused to be between these two types of unigram probabilities by a predetermined technique (e.g., MAP estimation or interpolation).

The acoustic model adaptation system 1 may obtain an adapted acoustic model using the adapted neural network 34 and the adapted unigram probabilities 44.

Next, operations of the acoustic model adaptation system 1 according to the first exemplary embodiment are described.

Figure 2:
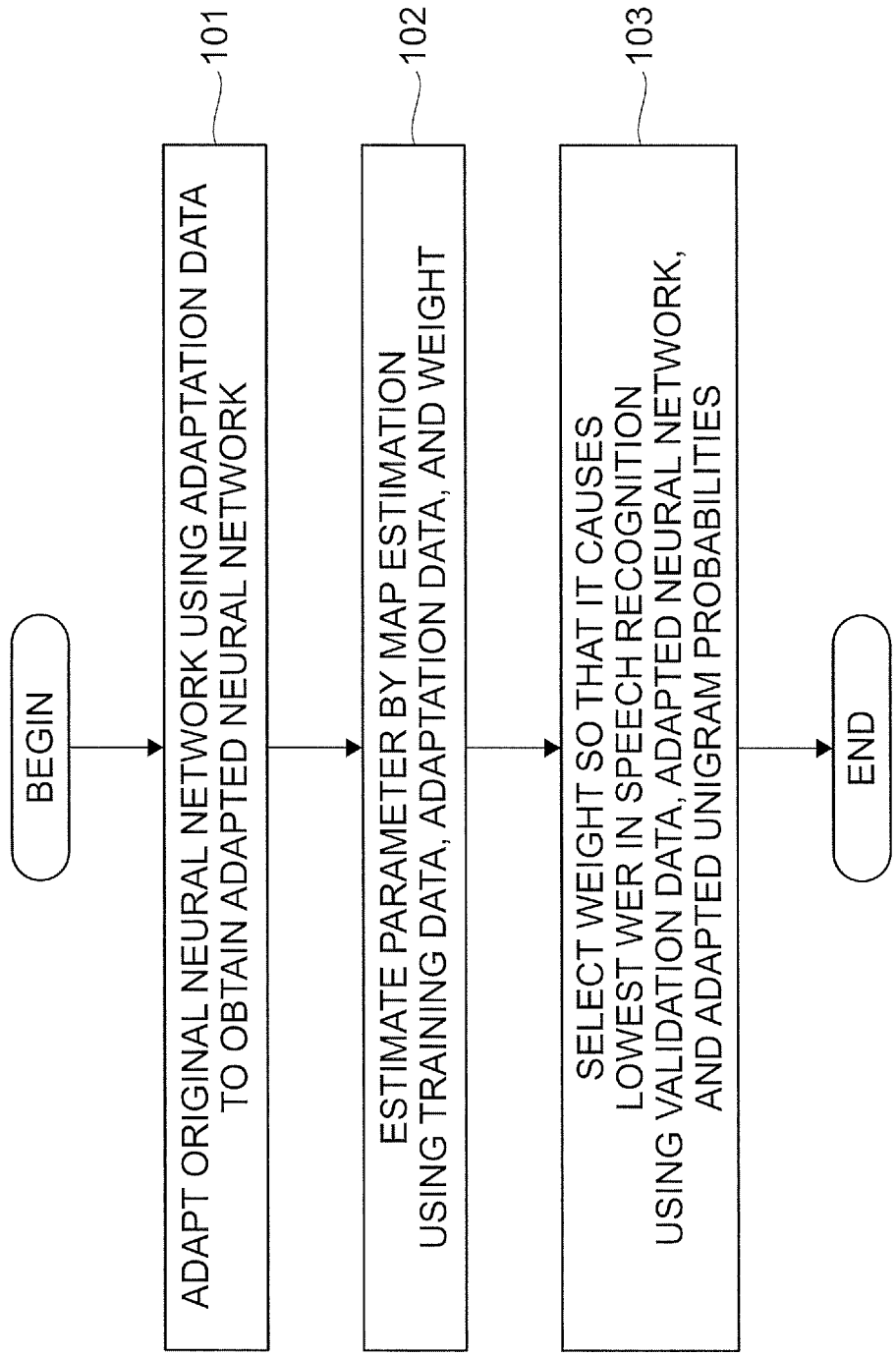
FIG. 2 depicts a flowchart representing an example of an operation of the acoustic model adaptation system according to the first exemplary embodiment of the present invention.

Referring to FIG. 2, there is shown a flowchart representing an example of an operation of the acoustic model adaptation system 1 according to the first exemplary embodiment. Note that the original neural network 32 and the original unigram probabilities 42 are assumed to have been trained by the neural network trainer 31 and the unigram probability trainer 41, respectively, using the training data stored in the training data storage 10, prior to the operation of the acoustic model adaptation system 1.

As shown in FIG. 2, the neural network adapter 33 may adapt the original neural network 32 using the adaptation data stored in the adaptation data storage 20 to obtain the adapted neural network 34 (step 101). In other words, the neural network adapter 33 may conservatively retrain the original neural network 32 for an acoustic model adaptation. Such a conservative retraining of the original neural network 32 may be performed by a combination of a weight decay and a Kullback-Leibler Divergence (KLD) regularization. The weight decay is disclosed in a document "Hank, Liao, "Speaker adaptation of context dependent deep neural networks", in IEEE international conference on acoustics, speech and signal processing, May 26, 2013". The KLD regularization is disclosed in a document "Dong Yu, Kaisheng Yao, Hang Su, Gang Li, Frank Seide, "KL-divergence regularized deep neural network adaptation for improved large vocabulary speech recognition", in IEEE international conference on acoustics, speech and signal processing, May 26, 2013".

Meanwhile, the unigram probability adapter 43 may estimate a parameter $\theta_{up}$ by maximum a posteriori (MAP) estimation using the training data stored in the training data storage 10, the adaptation data stored in the adaptation data storage 20, and a weight $\beta$ (step 102). Specifically, the MAP estimation may be performed using the following formula.

$$\theta_{up} = \frac{\text{adaptation\_data\_count\_i} + (\beta \times \text{training\_data\_count\_i} - 1)}{\sum_j \text{adaptation\_data\_count\_j} + \sum_j (\beta \times \text{training\_data\_count\_j} - 1)}$$

The weight $\beta$ may be a weight of "training_data_count_k" to "adaptation_data_count_k" (k=i, j). Note that the weight $\beta$ serves as one example of the degrees of using of the training data and the adaptation data.

Subsequently, the unigram probability adapter 43 may select the weight $\beta$ so that it causes the lowest word error rate (WER) in speech recognition using validation data, the adapted neural network 34, and the adapted unigram probabilities 44 (step 103). Note that the WER serves as one example of the claimed result of speech recognition.

In the foregoing, the unigram probability adapter 43 estimates the parameter $\theta_{up}$ using the weight $\beta$ at step 102, and after that, selects the weight $\beta$ at step 103. However, the unigram probability adapter 43 may select the weight before estimating the parameter $\theta_{up}$. In this case, the unigram probability adapter 43 may select one predetermined weight as the weight $\beta$.

Figure 3:
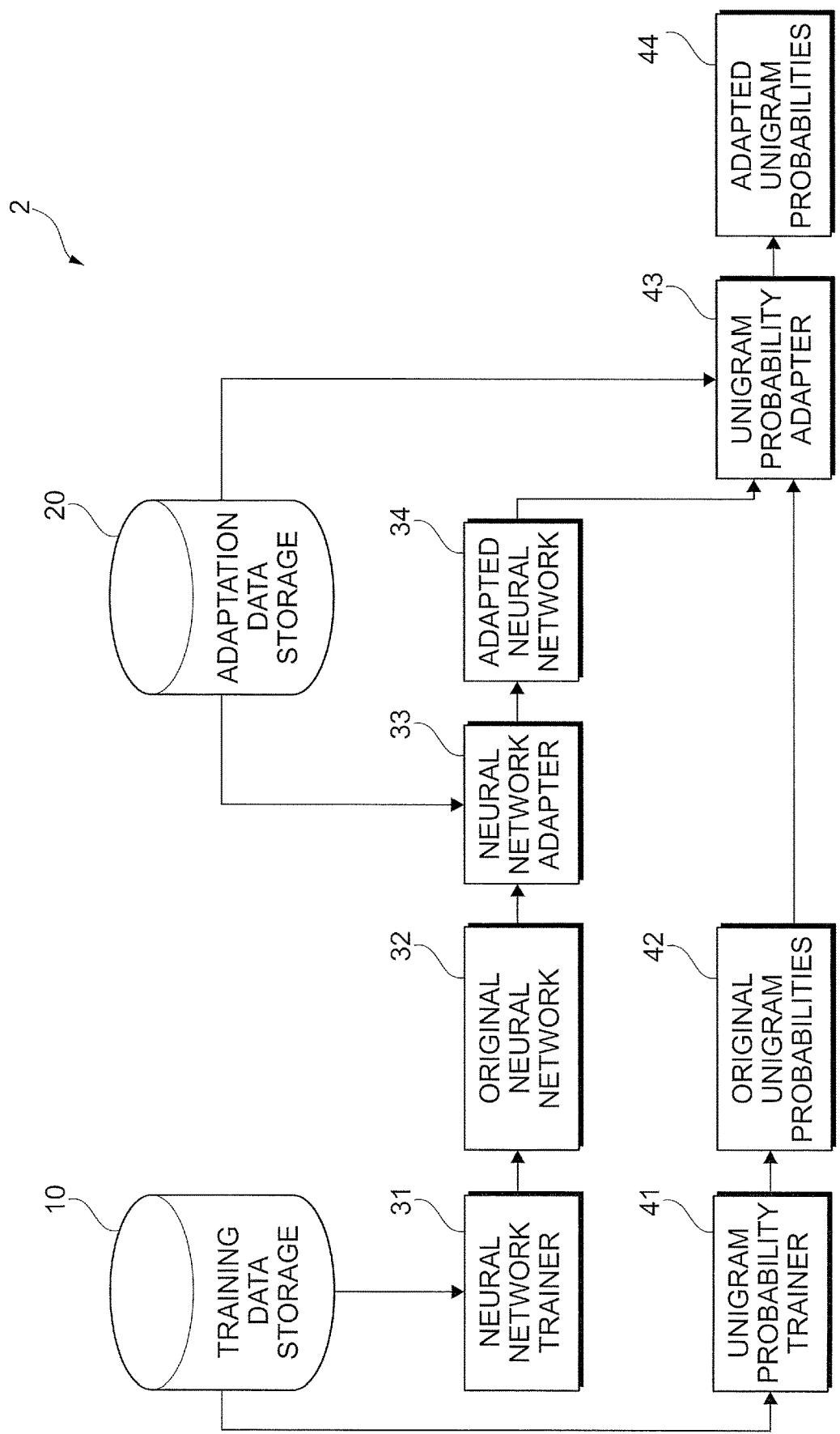
FIG. 3 depicts a block diagram of an acoustic model adaptation system according to the second exemplary embodiment of the present invention.

Referring to FIG. 3, there is shown a block diagram of an acoustic model adaptation system 2 to which a second exemplary embodiment is applied. As shown in FIG. 3, the acoustic model adaptation system 2 may include a training data storage 10 and an adaptation data storage 20. The acoustic model adaptation system 2 may further include a neural network trainer 31 and a neural network adapter 33. The acoustic model adaptation system 2 may furthermore include a unigram probability trainer 41 and a unigram probability adapter 43. Note that FIG. 3 also shows an original neural network 32, an adapted neural network 34, original unigram probabilities 42, and adapted unigram probabilities 44, although they are not elements constituting the acoustic model adaptation system 2 but elements obtained in the acoustic model adaptation system 2.

The block diagram in FIG. 3 is the same as that in FIG. 1, except that the former does not have an arrow line directly from the training data storage 10 to the unigram probability adapter 43, unlike the latter. Specifically, in the second exemplary embodiment, the training data storage 10 may store training data to be used by the neural network trainer 31 and the unigram probability trainer 41. Further, in the second exemplary embodiment, the unigram probability adapter 43 may adapt the original unigram probabilities 42 by changing the parameter $\theta_{up}$ using the original unigram probabilities 42 and unigram probabilities obtained using only the adaptation data stored in the adaptation data storage 20.

Next, operations of the acoustic model adaptation system 2 according to the second exemplary embodiment are described.

Figure 4:
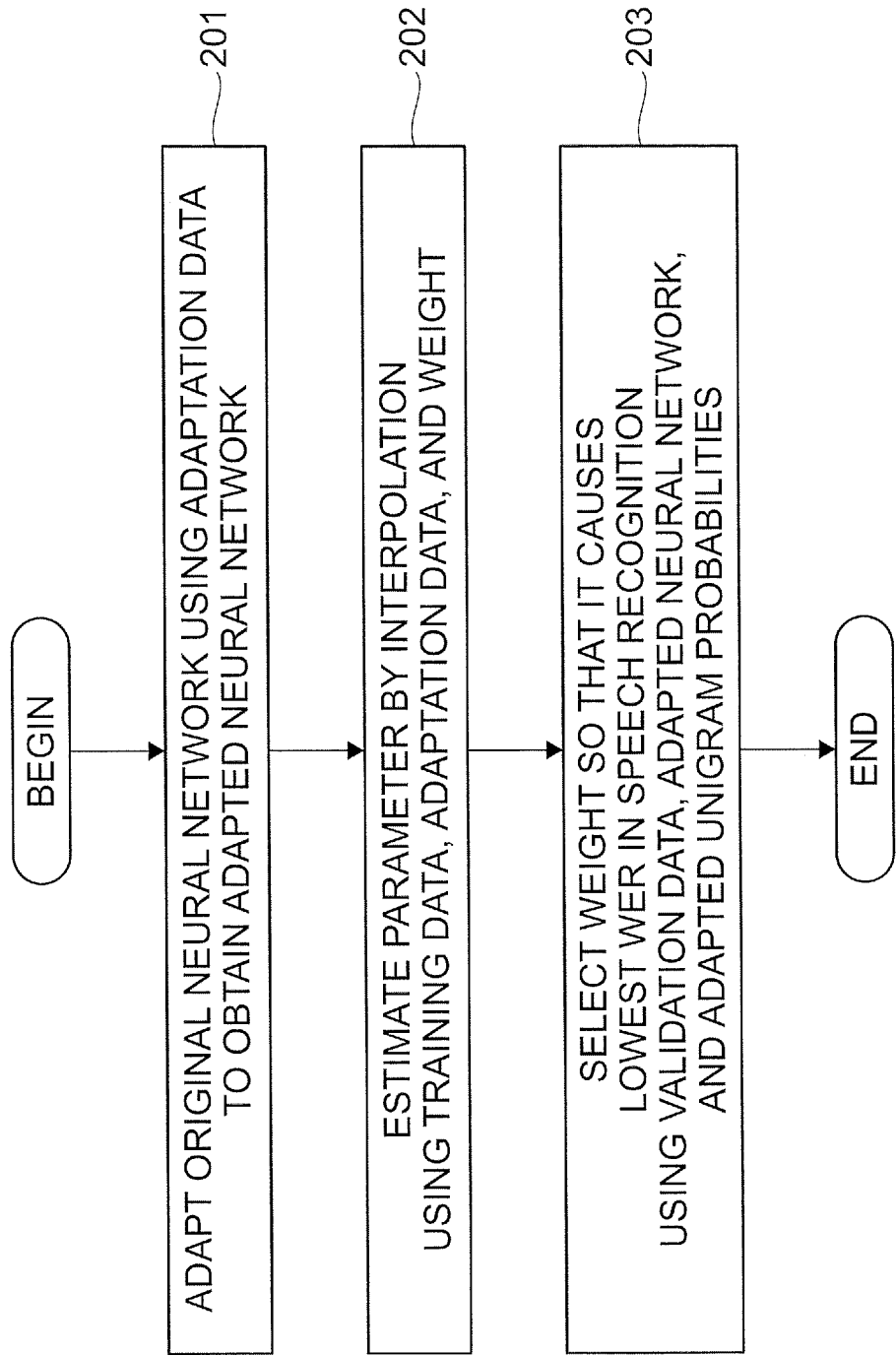
FIG. 4 depicts a flowchart representing an example of an operation of the acoustic model adaptation system according to the second exemplary embodiment of the present invention.

Referring to FIG. 4, there is shown a flowchart representing an example of an operation of the acoustic model adaptation system 2 according to the second exemplary embodiment. Note that the original neural network 32 and the original unigram probabilities 42 are assumed to have been trained by the neural network trainer 31 and the unigram probability trainer 41, respectively, using the training data stored in the training data storage 10, prior to the operation of the acoustic model adaptation system 2.

As shown in FIG. 4, the neural network adapter 33 may adapt the original neural network 32 using the adaptation data stored in the adaptation data storage 20 to obtain the adapted neural network 34 (step 201). In other words, the neural network adapter 33 may conservatively retrain the original neural network 32 for an acoustic model adaptation. Such a conservative retraining of the original neural network 32 may be performed by a combination of the weight decay and the Kullback-Leibler Divergence (KLD) regularization in the same manner as in the first exemplary embodiment.

Meanwhile, the unigram probability adapter 43 may estimate a parameter $\theta_{up}$ by interpolation using the training data stored in the training data storage 10, the adaptation data stored in the adaptation data storage 20, and a weight $\gamma$ (step 202). Specifically, the interpolation may be performed using the following formula.

$$\theta_{up} = \gamma \times \frac{\text{adaptation\_data\_count\_i}}{\sum_j \text{adaptation\_data\_count\_j}} + (1-\gamma) \frac{\text{training\_data\_count\_i}}{\sum_j \text{training\_data\_count\_j}}$$

Since the term "adaptation_data_count_k" represents a count of the k-th context-dependent phone in the adaptation data (k=i, j), a fraction in the first term of the above formula may correspond to unigram probabilities of the context-dependent phones obtained using only the adaptation data stored in the adaptation data storage 20. Further, since the term "training_data_count_k" represents a count of the k-th context-dependent phone in the training data (k=i, j), a fraction in the second term of the above formula may correspond to the original unigram probabilities 42. Thus, the weight $\gamma$ may be a weight of the unigram probabilities of the context-dependent phones obtained using only the adaptation data. Note that the weight $\gamma$ serves as one example of the degrees of using of the training data and the adaptation data.

Subsequently, the unigram probability adapter 43 may select the weight $\gamma$ so that it causes the lowest WER in speech recognition using validation data, the adapted neural network 34, and the adapted unigram probabilities 44 (step 203). Note that the WER serves as one example of the claimed result of speech recognition.

In the foregoing, the unigram probability adapter 43 estimates the parameter $\theta_{up}$ using the weight $\gamma$ at step 102, and after that, selects the weight $\gamma$ at step 103. However, the unigram probability adapter 43 may select the weight $\gamma$ before estimating the parameter $\theta_{up}$. In this case, the unigram probability adapter 43 may select one predetermined weight as the weight $\gamma$.

Next, a hardware configuration of the neural network adapter 33 and the unigram probability adapter 43 is described. Note that the neural network adapter 33 and the unigram probability adapter 43 have the same hardware configuration, so the description will be for the hardware configuration of a computer 90.

Figure 5:
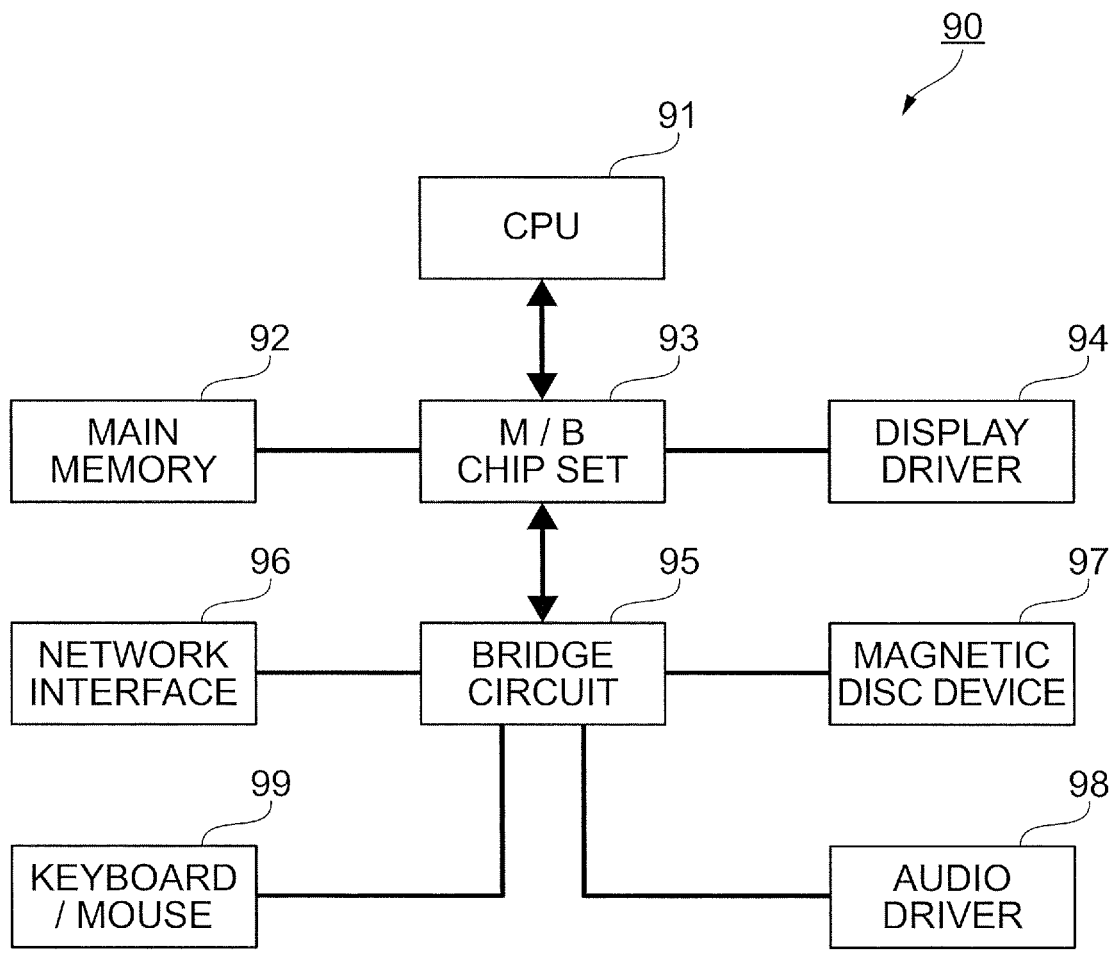
FIG. 5 depicts an example of a hardware configuration of a computer constituting the acoustic model adaptation system according to the exemplary embodiments of the present invention.

Referring to FIG. 5, there is shown an example of a hardware configuration of the computer 90. As shown in FIG. 5, the computer 90 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 5, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

The present invention may be a system, a method, and/or a computer program product. The computer program product may include a computer readable storage medium (or media) with computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium includes instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for adapting an acoustic model to a specific environment, the method comprising:

training an adapted model by adapting an original model to the specific environment using adaptation data, the original model having been previously trained with a neural network, the neural network adapted by a neural network adapter responsive to the adaption data, by estimating a parameter that depends on a weight applied to each context-dependent phone using training data and being used to calculate probabilities of context-dependent phones given an acoustic feature responsive to the training data;

obtaining adapted unigram probabilities by adapting original unigram probabilities using the training data and the adaptation data, the original unigram probabilities being trained using the training data and being prior unigram probabilities of context-dependent phones;

generating a trained acoustic model from the adapted model and the adapted unigram probabilities; and storing the trained adapted model on a speech recognition device configured to recognize verbal utterances and convert them to digital text.

2. The method of claim 1, further comprising determining degrees of using of the training data and the adaptation data in obtaining the adapted unigram probabilities, using a result of speech recognition which uses the adapted model and the adapted unigram probabilities as the trained acoustic model.

3. The method of claim 1, wherein the original model includes a neural network.

4. The method of claim 1, wherein obtaining the adapted unigram probabilities includes obtaining the adapted unigram probabilities by a predetermined technique which causes the adapted unigram probabilities to be between the original probabilities and the prior probabilities obtained using only the adaptation data.

5. The method of claim 4, wherein the predetermined technique includes a maximum a posteriori (MAP) estimation.

6. The method of claim 4, wherein the predetermined technique includes an interpolation.

7. The method of claim 1, wherein the original probabilities include original unigram probabilities, and the prior probabilities include prior unigram probabilities.

8. The method of claim 7, wherein obtaining the adapted unigram further includes modelling the original unigram probabilities using a multinominal distribution.

9. The method of claim 7, wherein obtaining the adapted unigram further includes changing parameters of the original unigram probabilities based on the training data and the adaptation data.

10. The method of claim 1, wherein training an adapted model further includes retraining the original neural network based on a weight decay and a Kullback-Leibler Divergence (KLD) regularization.

11. The method of claim 1, wherein estimating the parameter is performed by maximum a posteriori estimation.

12. The method of claim 1, wherein estimating the parameter is performed by interpolation.

13. The method of claim 1, wherein the weight is based on a ratio of training data to adaptation data.

14. The method of claim 1, wherein the parameter further depends on a weighted combination of each context-dependent phone in the training data and each context-dependent phone in the adaptation data.

* * * * *